US009756060B2

(12) United States Patent
Abuelsaad et al.

(10) Patent No.: US 9,756,060 B2
(45) Date of Patent: *Sep. 5, 2017

(54) SECURITY MANAGEMENT IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, Baltimore, MD (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,601

(22) Filed: Nov. 15, 2016

(65) Prior Publication Data

US 2017/0063895 A1 Mar. 2, 2017

Related U.S. Application Data

(63) Continuation of application No. 15/142,456, filed on Apr. 29, 2016, now Pat. No. 9,565,206, which is a
(Continued)

(51) Int. Cl.
*H04L 29/06* (2006.01)
*G06F 21/55* (2013.01)
*H04L 29/08* (2006.01)

(52) U.S. Cl.
CPC .......... *H04L 63/1416* (2013.01); *G06F 21/55* (2013.01); *G06F 21/552* (2013.01);
(Continued)

(58) Field of Classification Search
CPC .............................. G06F 21/552; G06F 21/554
See application file for complete search history.

(56) References Cited

U.S. PATENT DOCUMENTS

| 7,472,421 B2 | 12/2008 | Cummins |
| 8,402,546 B2 | 3/2013 | Greenshpon et al. |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Hadi Armouche
*Assistant Examiner* — Hee Song
(74) *Attorney, Agent, or Firm* — William H. Hartwell; Maxine L. Barasch; Keohane & D'Alessandro PLLC

(57) ABSTRACT

An approach for addressing (e.g., preventing) detected network intrusions in a virtualized/networked (e.g., cloud) computing environment is provided. In a typical embodiment, users may group components/systems of an environment/domain according to a range of security sensitivity levels/classifications. The users may further configure rules for responding to security threats for each security sensitivity level/classification. For example, if a "highly dangerous" security threat is detected in or near a network segment that contains highly sensitive systems, the user may configure rules that will automatically isolate those systems that fall under the high security classification. Such an approach allows for more granular optimization and/or management of system security/intrusion prevention that may be managed at a system level rather than at a domain level.

20 Claims, 9 Drawing Sheets

Related U.S. Application Data continuation of application No. 13/732,678, filed on Jan. 2, 2013, now Pat. No. 9,361,455.

(52) U.S. Cl.
CPC .......... *G06F 21/554* (2013.01); *H04L 63/105* (2013.01); *H04L 63/1408* (2013.01); *H04L 63/1433* (2013.01); *H04L 63/1441* (2013.01); *H04L 63/20* (2013.01); *H04L 67/02* (2013.01)

(56) References Cited

U.S. PATENT DOCUMENTS

| | | | |
|---|---|---|---|
| 8,412,945 | B2 | 4/2013 | Sweet et al. |
| 9,361,455 | B2 | 6/2016 | Abuelsaad et al. |
| 2005/0204404 | A1 | 9/2005 | Hrabik et al. |
| 2006/0282892 | A1* | 12/2006 | Jonnala ............... H04L 63/1458 726/23 |
| 2007/0169194 | A1 | 7/2007 | Church et al. |
| 2008/0240128 | A1* | 10/2008 | Elrod .................... H04L 12/64 370/401 |
| 2010/0071024 | A1 | 3/2010 | Eyada |
| 2010/0257605 | A1 | 10/2010 | McLaughlin et al. |
| 2010/0332593 | A1 | 12/2010 | Barash et al. |
| 2011/0219434 | A1 | 9/2011 | Betz et al. |
| 2011/0302291 | A1 | 12/2011 | Draugelis |
| 2012/0204251 | A1 | 8/2012 | Kopti |
| 2012/0265976 | A1 | 10/2012 | Spiers et al. |
| 2012/0266231 | A1 | 10/2012 | Spiers et al. |
| 2013/0024919 | A1 | 1/2013 | Welter et al. |
| 2013/0031634 | A1 | 1/2013 | McClure et al. |
| 2013/0042115 | A1 | 2/2013 | Sweet et al. |
| 2013/0305316 | A1 | 11/2013 | DeLuca et al. |
| 2014/0173739 | A1 | 6/2014 | Ahuja et al. |
| 2014/0189865 | A1 | 7/2014 | Abuelsaad et al. |
| 2014/0189868 | A1 | 7/2014 | Laniepce et al. |
| 2016/0248804 | A1 | 8/2016 | Abuelsaad et al. |

OTHER PUBLICATIONS

Mell, P. et al., "The NIST Definition of Cloud Computing", National Institute of Standards and Technology, Information Technology Laboratory, Vers. 15, Oct. 7, 2009, 2 pages.

"Snortsam—A Firewall Blocking Agent for Snort", http://snortsam.net/, Sep. 9, 2012, 1 page.

"Security Groups", Amazon Elastic Compute Cloud, User Guide (API Version Jul. 20, 2012), 5 pages.

Hee K. Song, USPTO Office Action, U.S. Appl. No. 13/732,678, Notification Date Aug. 25, 2014, 14 pages.

Hee K. Song, USPTO Final Office Action, U.S. Appl. No. 13/732,678, Notification Date Jan. 14, 2015, 9 pages.

Hee K. Song, USPTO Office Action, U.S. Appl. No. 13/732,678, Notification Date May 13, 2015, 12 pages.

Hee K. Song, USPTO Final Office Action, U.S. Appl. No. 13/732,678, Notification Date Nov. 25, 2015, 9 pages.

Hee K. Song, USPTO Notice of Allowance and Fee(s) Due, U.S. Appl. No. 13/732,678, Date Mailed Feb. 12, 2016, 18 pages.

Hee K. Song, USPTO Notice of Allowance and Fee(s) Due, U.S. Appl. No. 13/732,678, Date Mailed Mar. 15, 2016, 9 pages.

Hee K Song, USPTO Office Action, U.S. Appl. No. 15/142,456, Notification Date Jun. 21, 2016, 14 pages.

Hee K. Song, USPTO Notice of Allowance and Fee(s) Due, U.S. Appl. No. 15/142,456, Date Mailed Sep. 26, 2016, 21 pages.

\* cited by examiner

SECURITY MANAGEMENT IN A NETWORKED COMPUTING ENVIRONMENT

RELATED U.S. APPLICATION DATA

The present patent document is a continuation of U.S. patent application Ser. No. 15/142,456, filed Apr. 29, 2016, which is a continuation of U.S. patent application Ser. No. 13/732,678, filed Jan. 2, 2013, now U.S. Pat. No. 9,361,455, issued Jun. 7, 2016. The entire contents of each of such applications are incorporated herein by reference.

TECHNICAL FIELD

In general, embodiments of the present invention relate to security management. Specifically, embodiments of the present invention relate to the management of system security based on predefined rules in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One advantage of cloud computing environments is that users and developers have tools to enable the creation and utilization of services in a condensed period of time. However, as the infrastructures for users to run their workloads in cloud environments continue to grow, available security managements tools and services struggle have not always kept pace with this growth. In particular, challenges may exist in detecting and effectively addressing network-based security attacks (i.e., intrusions). For example, existing approaches typically rely on a quarantine approach once a source of an intrusion is determined and/or rely on tools that may not be designed to be operated by an average user who may desire to actively secure their resources.

SUMMARY

Embodiments of the present invention provide an approach for addressing (e.g., preventing) detected network intrusions in a virtualized/networked (e.g., cloud) computing environment. In a typical embodiment, users may group components/systems of an environment/domain according to a range of security sensitivity levels/classifications. The users may further configure rules for responding to security threats for each security sensitivity level/classification. For example, if a "highly dangerous" security threat is detected in or near a network segment that contains highly sensitive systems, the user may configure rules that will automatically isolate those systems that fall under the high security classification. Such an approach allows for more granular optimization and/or management of system security/intrusion prevention that may be managed at a system level rather than at a domain level.

A first aspect provides a computer-implemented method for managing security in a networked computing environment, comprising: assigning a set of security sensitivity levels to a set of components of the networked computing environment; detecting an attempted intrusion into at least one component of the set of components; determining a threat level of the attempted intrusion; and addressing the attempted intrusion based upon the security sensitivity level assigned to the at least one component, the threat level of the attempted intrusion, and a set of rules stored in a computer storage device.

A second aspect provides a system for managing security in a networked computing environment, comprising: a memory medium comprising instructions; a bus coupled to the memory medium; and a processor coupled to the bus that when executing the instructions causes the system to: assign a set of security sensitivity levels to a set of components of the networked computing environment; detect an attempted intrusion into at least one component of the set of components; determine a threat level of the attempted intrusion; and address the attempted intrusion based upon the security sensitivity level assigned to the at least one component, the threat level of the attempted intrusion, and a set of rules stored in a computer storage device.

A third aspect provides a computer program product for managing security in a networked computing environment, the computer program product comprising a computer readable storage media, and program instructions stored on the computer readable storage media, to:
assign a set of security sensitivity levels to a set of components of the networked computing environment; detect an attempted intrusion into at least one component of the set of components; determine a threat level of the attempted intrusion; and address the attempted intrusion based upon the security sensitivity level assigned to the at least one component, the threat level of the attempted intrusion, and a set of rules stored in a computer storage device.

A fourth aspect provides a method for deploying a system for managing security in a networked computing environment, comprising: providing a computer infrastructure being operable to: assign a set of security sensitivity levels to a set of components of the networked computing environment; detect an attempted intrusion into at least one component of the set of components; determine a threat level of the attempted intrusion; and address the attempted intrusion based upon the security sensitivity level assigned to the at least one component, the threat level of the attempted intrusion, and a set of rules stored in a computer storage device.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
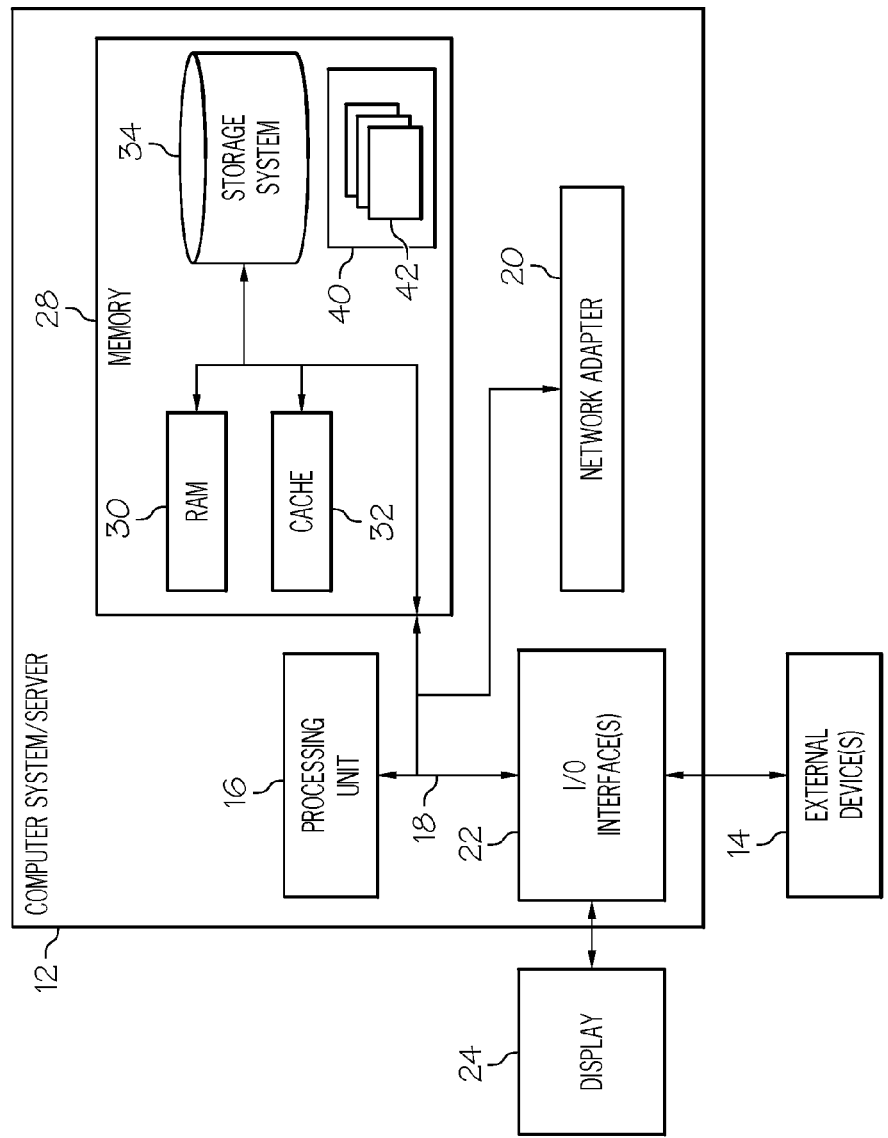
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for addressing (e.g., preventing) detected network intrusions in a virtualized/networked (e.g., cloud) computing environment. In a typical embodiment, users may group components/systems of an environment/domain according to a range of security sensitivity levels/classifications. The users may further configure rules for responding to security threats for each security sensitivity level/classification. For example, if a "highly dangerous" security threat is detected in or near a network segment that contains highly sensitive systems, the user may configure rules that will automatically isolate those systems that fall under the high security classification. Such an approach allows for more granular optimization and/or management of system security/intrusion prevention that may be managed at a system level rather than at a domain level.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
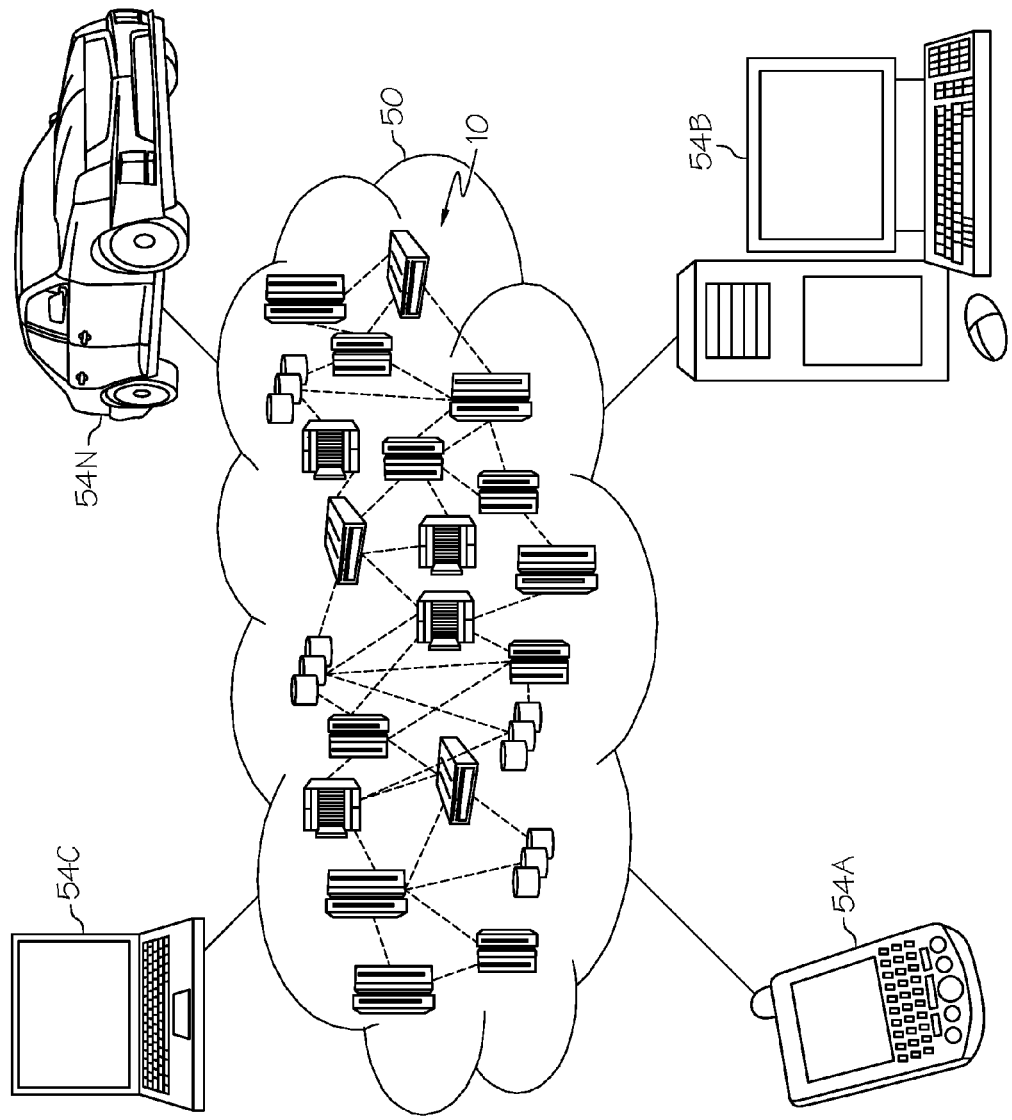
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
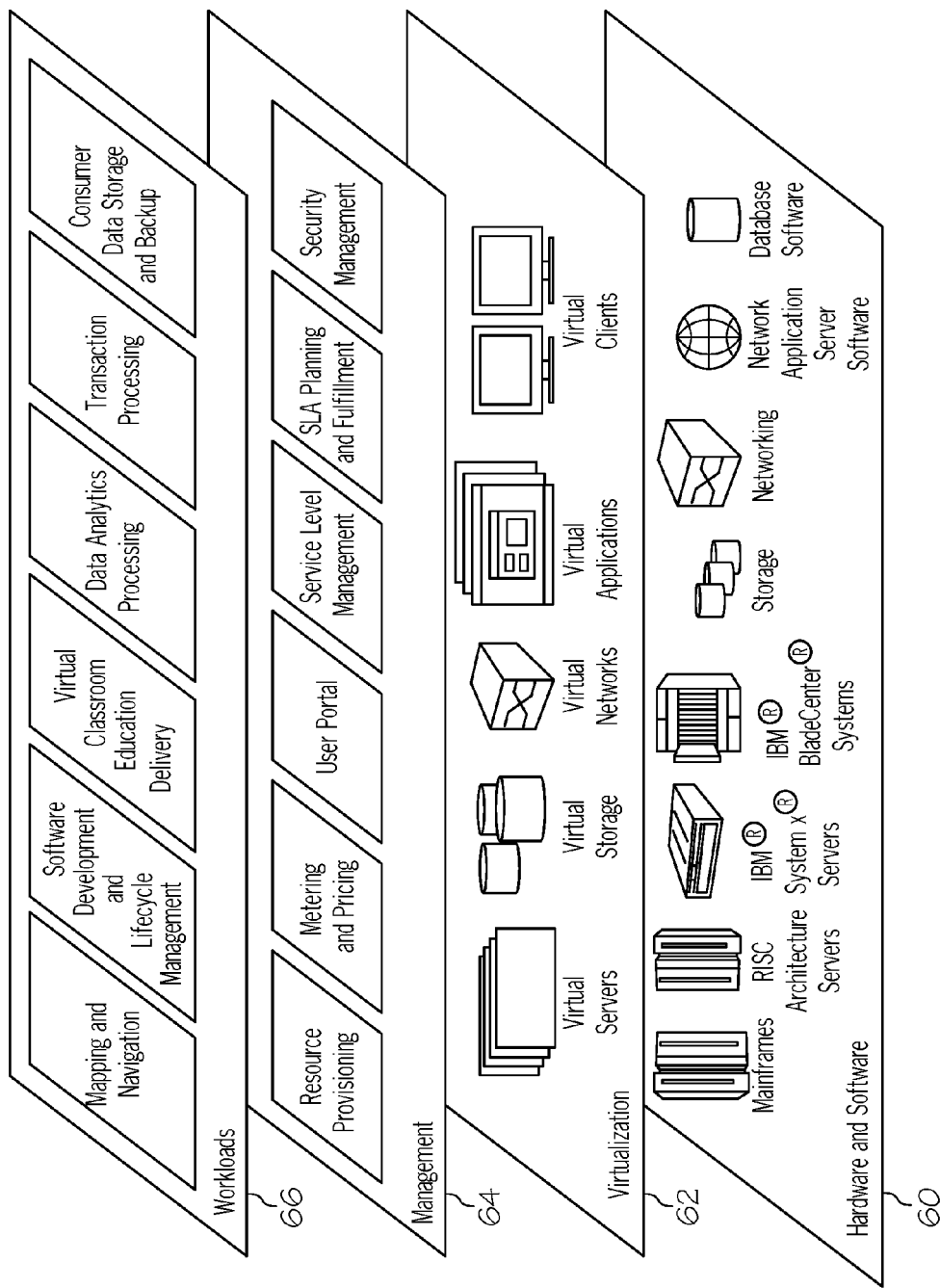
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is security management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the security management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
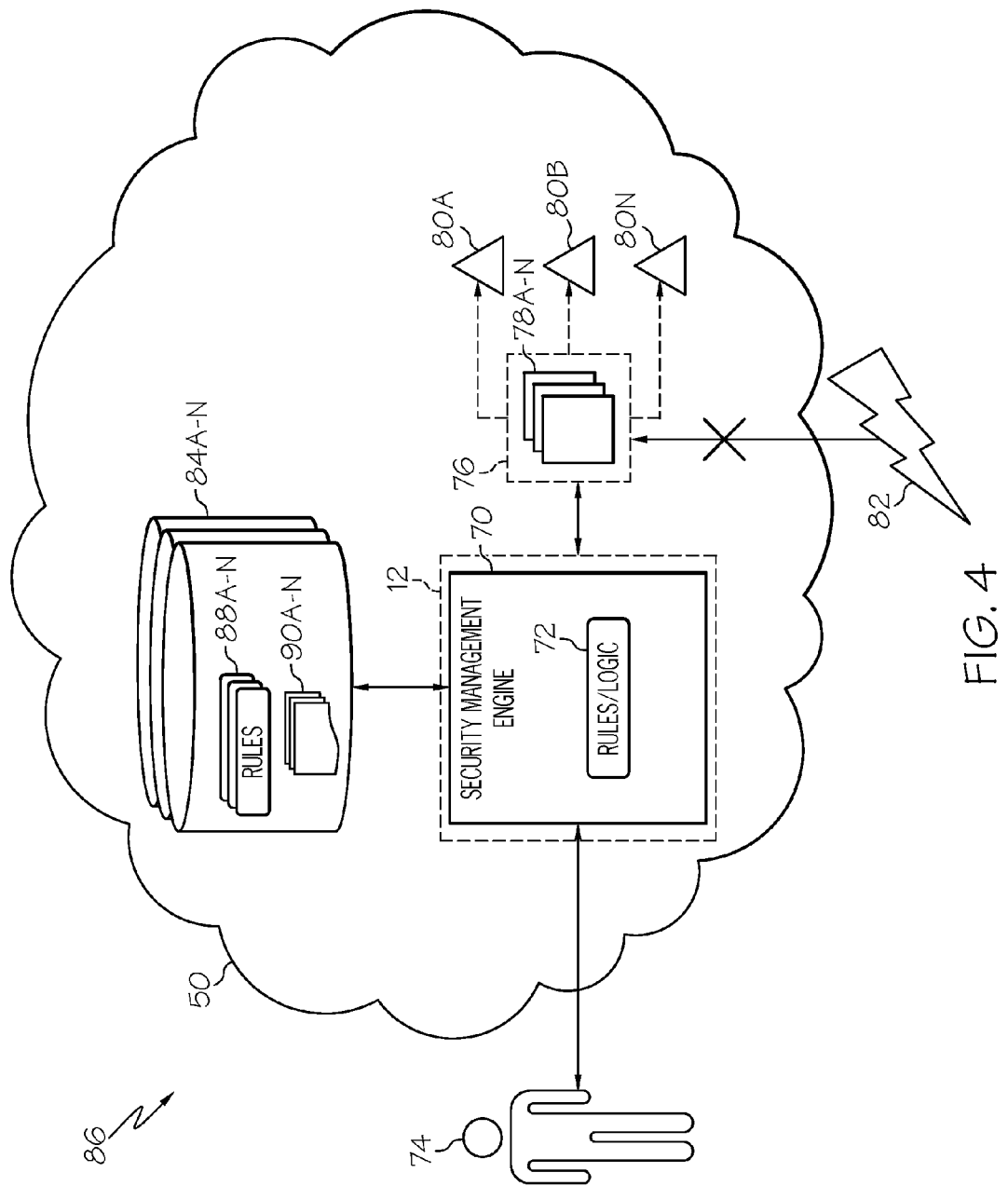
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a security management engine (engine 70). Rather, engine 70 could be loaded on a server or server-capable device that communicates (e.g., wirelessly) with the clients to provide security management therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides security management hereunder.

Along these lines, engine 70 may perform multiple functions similar to a general-purpose computer. Specifically, among other functions, engine 70 may (among other things): assign a set of security sensitivity levels 80A-N to a set of components 78A-N (within a domain 76) of the networked computing environment 86 (e.g., group the set of components 78A-N based on the assigned set of security sensitivity levels 80A-N as designated by a user 74 or the like); monitor the networked computing environment 86 and/or domain 76 for an attempted intrusion 82; detect the attempted intrusion 82 into at least one component of the set of components 78A-N; determine a threat level of the attempted intrusion 82 (e.g., based upon historical data 90A-N associated with previous attempted intrusions such as level of intrusion, damage inflicted, etc.); address the attempted intrusion 82 based upon the security sensitivity level 80A-N assigned to the at least one component, the threat level of the attempted intrusion 82 and a set of rules 88A-N stored in a computer storage device 84A-N; implement at least one action, as set forth in the set of rules 88A-N, to prevent the attempted intrusion 82 from accessing the at least one component; and/or block access to the at least one component.

Illustrative Example

As indicated above, embodiments of the present invention provide an approach for addressing (e.g., reacting to) detected network intrusions in a virtualized/networked (e.g., cloud) computing environment. FIGS. 5-8 demonstrate only one possible illustrative implementation for such an approach. Specifically, assume in an illustrative example that a user (e.g., who has one or more virtual machines deployed in a cloud environment) groups and classifies a set of virtual machines by varying levels of security sensitivity. The group having the highest risk security classification may comprise components considered most valuable and important to secure against any threat. Examples of such components may include database servers that store credit card information, competitive trade secret information, etc.

Figure 5:
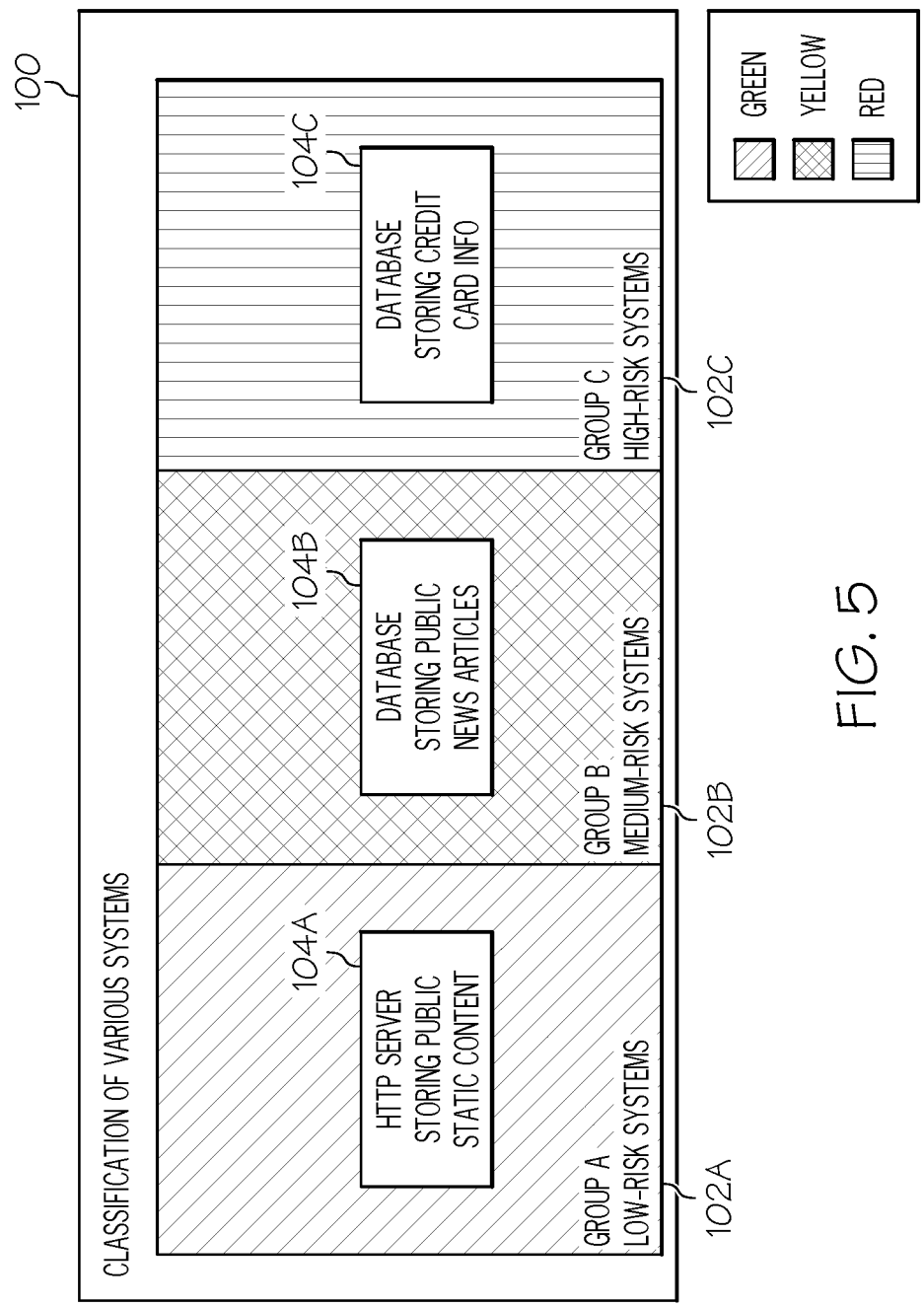
FIG. 5 depicts a diagram showing the grouping of systems according to an embodiment of the present invention.

FIG. 5 shows an interface 100 in which a user has grouped/assigned a set of security sensitivity levels 102A-C to a set of components/systems 104A-C. As shown, security sensitivity levels/component groupings comprise "low risk systems" 102A, "medium risk systems" 102B, and "high risk systems" 102C. As shown, the user has configured level/group 102A to include a HTTP server storing public content 104A (and not in need of a high level of security). The user has further configured level/group 1026 to include a database 1046 storing public news articles (and in need of a medium level of security). Still yet, the user has configured level/group 102C to include a database storing credit card information 104C (e.g., and in need of a high level of security).

Once components have been assigned to a group/security level, threats/intrusions may be evaluated, and actions taken based upon a set of rules. Specifically, engine 70 (FIG. 4) will monitor the corresponding domain for network intrusions and other harmful activity. A participating user may configure the rules for how and when to deal with flagged security alerts. Security alerts and/or network intrusion attempts may be flagged based upon historical data of previous intrusions. Regardless, examples of rules may include:

a. If a threat level detected is high, then completely cut communication of any means (i.e., by blocking all ports via firewall) to any of the user's resources which are under the "high risk" classification.

b. If a threat level detected is medium, take two actions:
i. Remove network access only for those high security systems that are in the same VLAN as the source of the threat;
ii. For high security systems that are in a different VLAN than the source of the threat, block the ports which are open between the two VLANs; however, do not block access to the high security sever from other servers which are in the same VLAN.

Figure 6:
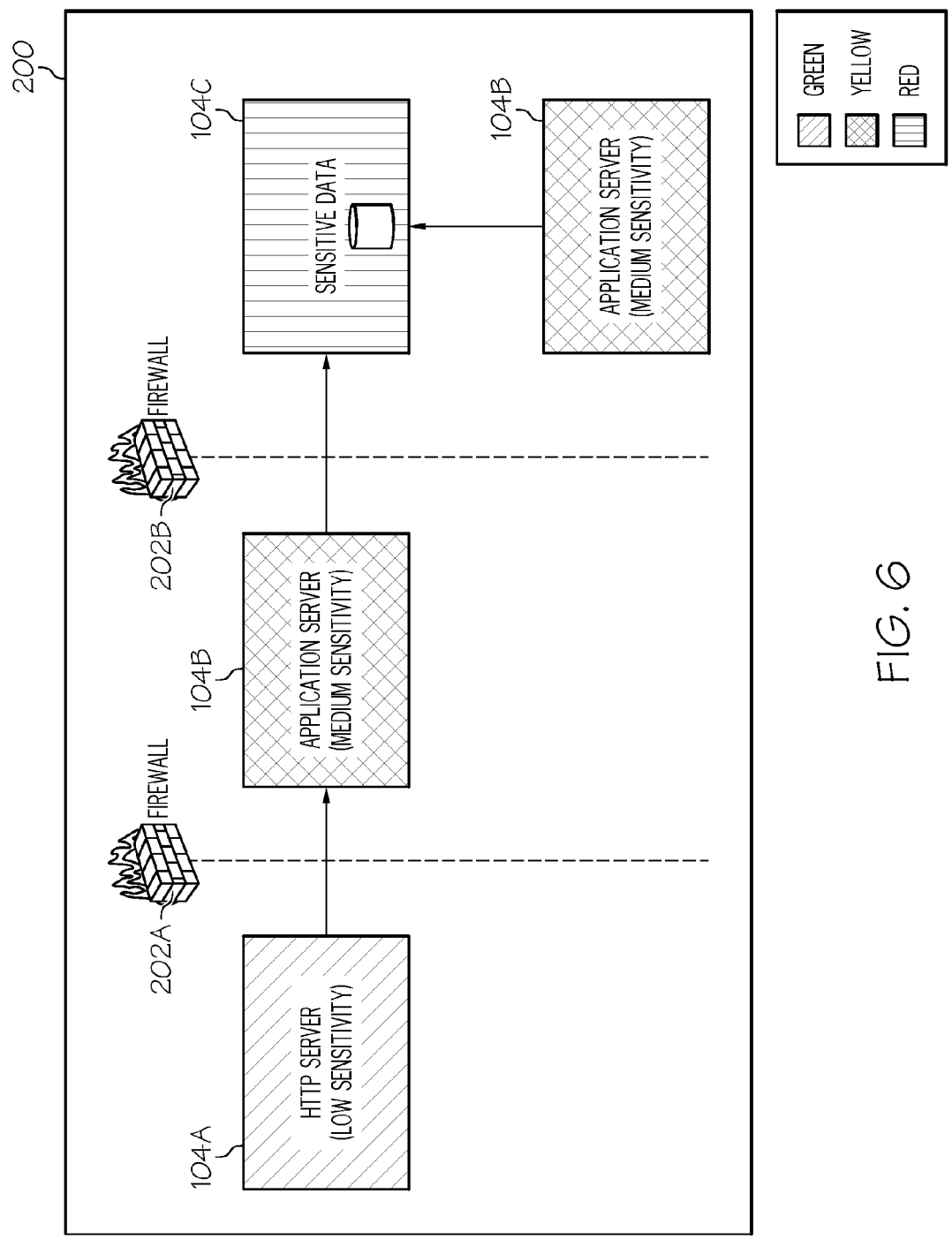
FIG. 6 shows an example of a system under normal operations according to an embodiment of the present invention.

Referring to FIG. 6, embodiments of the present invention will be described under a "normal" operation mode. As shown, domain 200 shows components 104A-C as they logically interrelate to one another. Under normal operation (e.g., where no intrusion is being attempted), domain 200 may rely on firewalls 202A-B to provide desired levels of security (i.e., engine 70 need to isolate any of components 104A-C)

Figure 7:
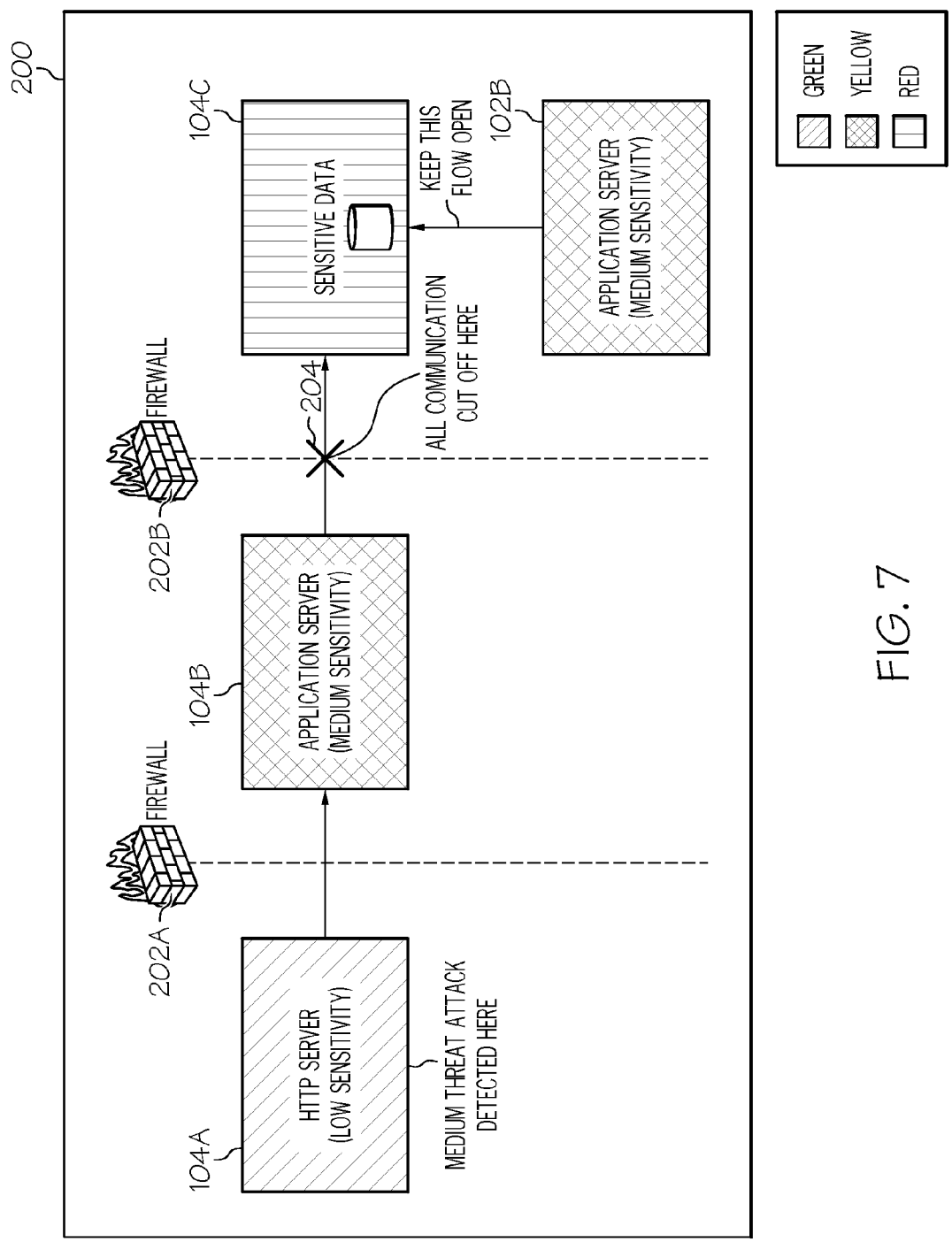
FIG. 7 shows an example of a system under a medium security threat according to an embodiment of the present invention.

Referring to FIG. 7, embodiments of the present invention will be described in response to a medium security threat. As indicated above, an attempted intrusion may be classified in terms of threat level based upon historical data (e.g., what type of threat did a similar intrusion attempt in the past represent). Regardless, as shown, components 104A-C of domain 200 are being subjected to an attempted intrusion posing a medium level security threat. Based on a set of rules previously configured (e.g., by a user and/or administrator), component 104C (e.g., previously assigned to high risk system group 102C of FIG. 5) should be protected from such an attack. As such, engine 70 (FIG. 4) will implement an action 204 that results in communication to component 104C being cut off at firewall 202B.

Figure 8:
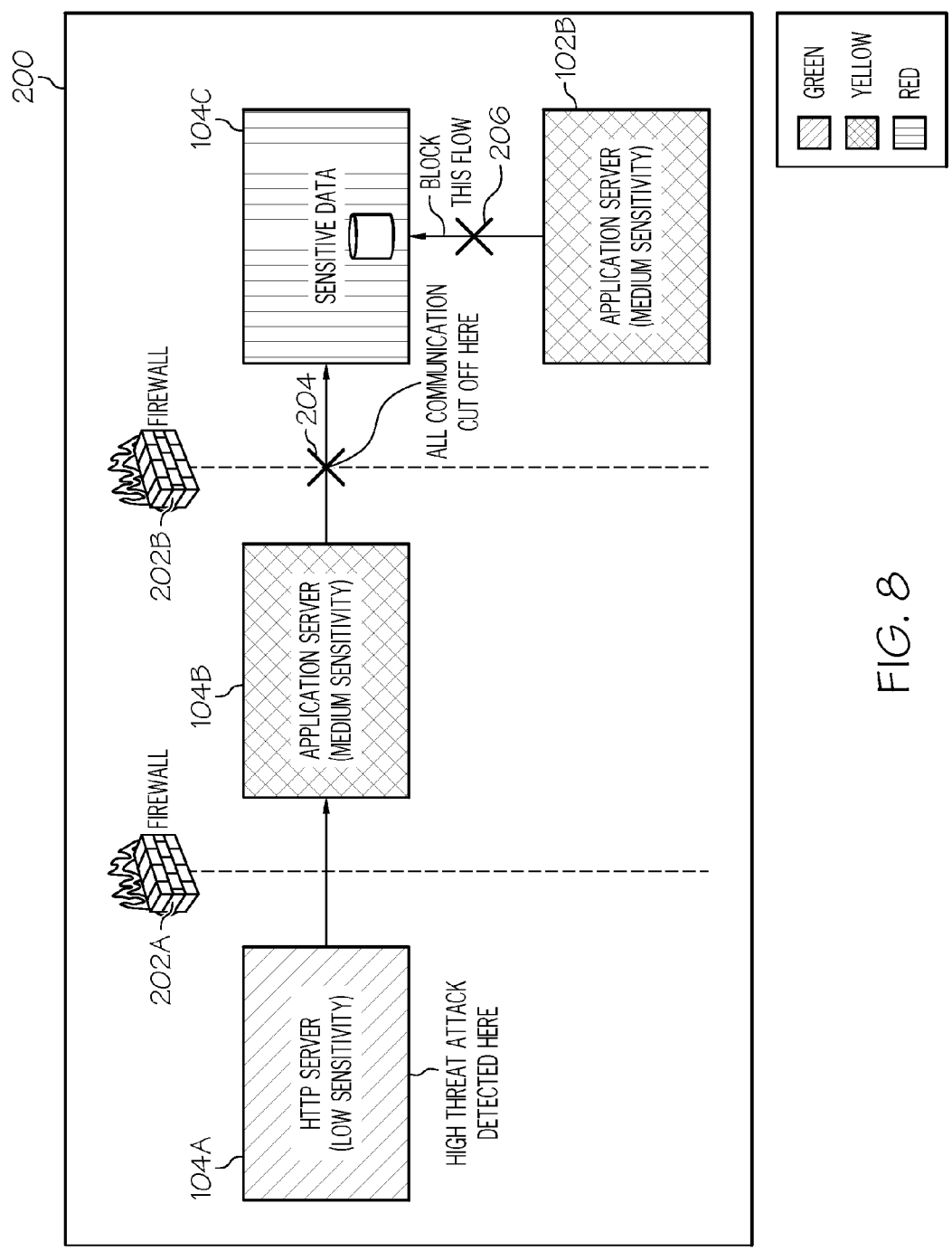
FIG. 8 shows an example of a system under a medium security threat according to an embodiment of the present invention.

Referring to FIG. 8, embodiments of the present invention will be described in response to a high security threat. As indicated above, an attempted intrusion may be classified in terms of threat level based upon historical data (e.g., what type of threat did a similar intrusion attempt in the past represent). Regardless, as shown, components 104A-C of domain 200 are being subjected to an attempted intrusion posing a high level security threat. Based on a set of rules previously configured (e.g., by a user and/or administrator), all communication with component 104C (e.g., previously assigned to high risk system group 102C of FIG. 5) should prevented. As such, engine 70 (FIG. 4) will implement actions 204 and 206 that result in all communication to component 104C being cut off from both components 1046 in communication therewith.

It is understood that the above rules are intended only as examples of the types or rules that could be configured and that other alternatives may be implemented hereunder. The approach described herein provides a flexible response to security threats, such that the user may choose how to protect their own valuable assets in a cloud environment (as opposed to a traditional approach that would only quarantine a source server).

Figure 9:
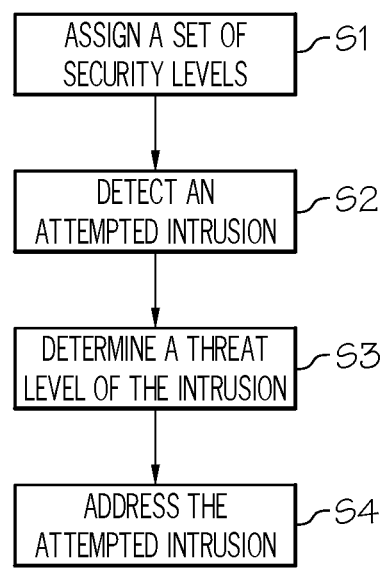
FIG. 9 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 9, a method flow diagram according to an embodiment of the present invention is shown. As shown, in step S1, a set of security sensitivity levels is assigned to a set of components of the networked computing environment. In step S2, an attempted intrusion into at least one component of the set of components is detected. In step S3, a threat level of the attempted intrusion is determined. In step S4, the attempted intrusion is addressed based upon the security sensitivity level assigned to the at least one component, the threat level of the attempted intrusion, and a set of rules stored in a computer storage device.

While shown and described herein as a security management solution, it is understood that the invention further provides various alternative embodiments. For example, in one embodiment, the invention provides a computer-readable/useable medium that includes computer program code to enable a computer infrastructure to provide security management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide security management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for security management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method, for managing security in a networked computing environment, comprising:
   detecting an attempted intrusion into at least one component of a plurality of components; and
   addressing the attempted intrusion based upon a security sensitivity level assigned to the at least one component, wherein the attempted intrusion is addressed by performing a first action affecting at least one first component and by performing a different second action affecting at least one second component of the plurality of components;
   wherein the at least one first component is in a virtual local area network (VLAN) containing a source of the attempted intrusion,
   wherein the at least one second component is in a VLAN other than the VLAN containing the source of the attempted intrusion,
   wherein the first action comprises blocking access to the at least one first component, and
   wherein the second action comprises blocking one or more ports that are open between the VLAN other than the VLAN containing the source of the attempted intrusion and the VLAN containing the source of the attempted intrusion, without blocking access to a high security sever from other servers that are in the VLAN containing the source of the attempted intrusion.

2. The computer-implemented method of claim 1, further comprising determining a threat level of the attempted intrusion.

3. The computer-implemented method of claim 2, wherein the determination of the threat level is based upon historical data.

4. The computer-implemented method of claim 1, further comprising monitoring the networked computing environment for attempted intrusion.

5. The computer-implemented method of claim 1, wherein the addressing is performed according to a set of rules.

6. The computer-implemented method of claim 1, wherein a solution service provider provides a computer infrastructure operable to perform the computer-implemented method.

7. The computer-implemented method of claim 1, the networked computing environment comprising a cloud computing environment.

8. A system for managing security in a networked computing environment, comprising:
- a memory medium comprising instructions;
- a bus coupled to the memory medium; and
- a processor coupled to the bus that when executing the instructions causes the system to:
  - detect an attempted intrusion into at least one component of a plurality of components; and
  - address the attempted intrusion based upon a security sensitivity level assigned to the at least one component, wherein the attempted intrusion is addressed by performing a first action affecting at least one first component and by performing a different second action affecting at least one second component of the plurality of components;
  - wherein the at least one first component is in a virtual local area network (VLAN) containing a source of the attempted intrusion,
  - wherein the at least one second component is in a VLAN other than the VLAN containing the source of the attempted intrusion,
  - wherein the first action comprises blocking access to the at least one first component, and
  - wherein the second action comprises blocking one or more ports that are open between the VLAN other than the VLAN containing the source of the attempted intrusion and the VLAN containing the source of the attempted intrusion, without blocking access to a high security sever from other servers that are in the VLAN containing the source of the attempted intrusion.

9. The system of claim 8, the memory medium further comprising instructions for determining a threat level of the attempted intrusion.

10. The system of claim 9, wherein the determining is based upon historical data.

11. The system of claim 10, wherein the historical data comprises data including level of intrusion of previous intrusions and damage inflicted by previous intrusions.

12. The system of claim 8, the memory medium further comprising instructions for causing the system to monitor the networked computing environment for attempted intrusion.

13. The system of claim 8, wherein the addressing is performed based on a set of rules.

14. The system of claim 8, the networked computing environment comprising a cloud computing environment.

15. A computer program product for managing security in a networked computing environment, the computer program product comprising a computer readable hardware storage device, and program instructions stored on the computer readable storage media, to:
- detect an attempted intrusion into at least one component of a plurality of components; and
- address the attempted intrusion based upon a security sensitivity level assigned to the at least one component, wherein the attempted intrusion is addressed by performing a first action affecting at least one first component and by performing a different second action affecting at least one second component of the plurality of components;
- wherein the at least one first component is in a virtual local area network (VLAN) containing a source of the attempted intrusion,
- wherein the at least one second component is in a VLAN other than the VLAN containing the source of the attempted intrusion,
- wherein the first action comprises blocking access to the at least one first component, and
- wherein the second action comprises blocking one or more ports that are open between the VLAN other than the VLAN containing the source of the attempted intrusion and the VLAN containing the source of the attempted intrusion, without blocking access to a high security sever from other servers that are in the VLAN containing the source of the attempted intrusion.

16. The computer program product of claim 15, the computer readable hardware storage device further comprising instructions to determine a threat level of the attempted intrusion.

17. The computer program product of claim 16, wherein the determining is based upon historical data.

18. The computer program product of claim 15, the computer readable hardware storage device further comprising instructions to monitor the networked computing environment for attempted intrusion.

19. The computer program product of claim 15, wherein the addressing is performed according to a set of rules.

20. The computer program product of claim 15, the networked computing environment comprising a cloud computing environment.

* * * * *